United States Patent
Shimamura et al.

(10) Patent No.: US 6,970,402 B1
(45) Date of Patent: Nov. 29, 2005

(54) CARRIER MECHANISM

(75) Inventors: Takao Shimamura, Saitama-ken (JP); Fumihiko Nakamura, Saitama-ken (JP); Hideaki Yoshimura, Saitama-ken (JP); Nobutaka Kawakita, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/490,113

(22) Filed: Jan. 24, 2000

(30) Foreign Application Priority Data

Jan. 22, 1999 (JP) .................................. 11-014725

(51) Int. Cl.⁷ ................................................ G11B 7/00

(52) U.S. Cl. .................................................. 369/44.28

(58) Field of Search .......................... 369/30.06, 30.2, 369/30.28, 30.31, 30.34, 30.35, 30.43, 30.45, 369/30.47, 30.49, 30.51, 30.55, 30.57, 30.59, 369/30.61, 30.72, 30.8, 30.87, 30.97, 34.01, 369/178.01, 191, 212, 251, 97.03, 36, 36.01, 369/30.32, 30.36, 30.76, 92

(56) References Cited

U.S. PATENT DOCUMENTS

| | | | | | |
|---|---|---|---|---|---|
| 4,594,700 | A | * | 6/1986 | Takahashi et al. | ....... 369/30.85 |
| 4,969,138 | A | * | 11/1990 | Ikedo et al. | ............. 369/30.88 |
| 6,091,695 | A | * | 7/2000 | Takigawa et al. | ........ 369/30.89 |

* cited by examiner

*Primary Examiner*—David Hudspeth
*Assistant Examiner*—Glenda P. Rodriguez
(74) *Attorney, Agent, or Firm*—Arent Fox PLLc

(57) ABSTRACT

There is provided a carrier mechanism which can move a carrier section 23 to a desired position with high accuracy. The carrier mechanism is comprised of the carrier section 23, a driving motor 18, and an actuator formed of a cam mechanism 13, 15 for transmitting a driving force of the driving motor 18 to the carrier section 23 to convey the same. When the carrier section 23 is moved upward with respect to the present position, the carrier section 23 is once moved (elevated) to a position in excess of a desired position, then moved downward from the exceeded position to the desired position. When the carrier section 23 is moved downward from the present position, the carrier section 23 is moved to the desired position without exceeding the desired position. By virtue of this operation, in both of the elevation and lowering of the carrier section 23, the carrier section 23 reaches the desired section by lowering thereto at its final stage of the movement. Further, the so-called actuator for driving the carrier section 23 is held in a predetermined direction, and therefore the carrier section 23 can be positioned to the desired position with high accuracy.

25 Claims, 12 Drawing Sheets

CARRIER MECHANISM

BACKGROUND OF THE INVENTION

This invention relates to a carrier mechanism, and more particularly to a carrier mechanism of this kind, which carries out positioning between accommodating means and carrier means, thereby inserting an object, such as a recording medium, which has been carried by the carrier means, into the accommodating means, or taking the accommodated object, such as the recording medium, out of the accommodating means to the carrier means.

Conventionally, carrier mechanisms of this kind are known, for example, from Japanese Patent Laid-Open Publication Nos. Hei7-61523 and Hei10-91241. The conventional carrier mechanisms are for use in information reproducing apparatuses which each reproduces information recorded on a recording medium. FIG. 16A schematically shows the arrangement of one of the carrier mechanisms, for example, in which the carrier mechanism is formed of an accommodating rack 2 which can accommodate a plurality of recording media 1, a motor 3, a carrier section 4 driven for up-and-down movement by the motor 3, a control section 5 for controlling the rotational quantity of the motor 3, and a potentiometer 6 for detecting the position in height of the carrier section 4. A power supply terminal Vcc and a grounding terminal GND are connected to both ends of the potentiometer 6. Further, the potentiometer 6 has a sliding terminal 7 to which is linked one end of the carrier section 4.

When the carrier section 4 is moved up and down in order to take out the recording medium 1 accommodated in a desired position of the accommodating rack 2, or in order to newly insert the recording medium 1 into the desired position of the accommodating rack 2, the control section 5 determines a present position of the carrier section 4, based on a divided voltage VR generated at the sliding terminal 7, and calculates the difference between the desired position and the present position. Then, the control section 5 supplies a driving voltage $V_{PWM}$ of rectangular waves which have been pulse-duration modulated, to the motor 3, and moves the carrier section 4 in the vertical direction such that the difference between the desired position and the present position is eliminated.

More specifically, as shown in a waveform diagram of FIG. 16B, at an initial actuation of the driving section 4, a positive DC voltage $V_{PWM}$ is supplied to the motor 3, whereby the carrier section 4 is moved at an accelerated rate. Then, over a time period between time points t1 to t2, a driving voltage $V_{PWM}$ of rectangular waves is supplied to the motor 3, whereby the carrier section 4 is moved at a constant rate. Thereafter, over a time period between time points t2 to t3, a negative DC voltage $V_{PWM}$ is supplied to thereby decelerate the carrier section 4, and finally the driving voltage $V_{PWM}$ of rectangular waves is supplied to thereby move the carrier section 4 to the desired position, followed by stopping the carrier section 4.

In the conventional carrier mechanism as above, the driving force of the motor 3 is transmitted to the carrier section 4 by way of an actuator formed of a plurality of gears etc., to thereby move the carrier section 4 up and down.

The actuator formed of the gears etc. is a movable mechanism, so that it unfavorably has a very small amount of plays, looseness, etc. Therefore, although the motor 3 is electrically driven and controlled by the driving voltage V, which has been pulse-duration modulated, the actuator inevitably causes mechanical displacement in the movement of the carrier section 4, and therefore in some cases, the carrier section 4 cannot be positioned to the desired position.

Especially in the information reproducing apparatus provided with the accommodating rack 2 which accommodates the recording media 1, such as CD's (compact discs), downsizing of the apparatus becomes popular, and hence the plurality of recording media 1 must be accommodated tightly in the height direction.

Therefore, the carrier mechanism with extremely high accuracy has been demanded.

That is, the apparatus of this kind is prone to undertake a slight amount of vertical displacement between the carrier section 4 and the desired position due to plays, looseness, etc. Such displacement can make it impossible for the accommodated recording medium 1 from being smoothly taken out of the accommodating rack 2, or the carried recording medium 1 from being smoothly inserted into the accommodating rack 2, and can further cause a failure of the apparatus. Therefore, a carrier mechanism which can position the carrier section 4 to the desired position with high accuracy has been desired.

SUMMARY OF THE INVENTION

It is therefore an object of the invention to provide a carrier mechanism which is capable of positioning carrier means to a desired position with high accuracy.

To attain the object, the invention provides a carrier mechanism having accommodating means and carrier means, for carrying out positioning between the accommodating means and the carrier means, to thereby insert an object carried from the carrier means in to the accommodating means, or take the object accommodated in the accommodating means, out of the accommodating means to the carrier means, the carrier mechanism comprising driving means for moving the carrier means, and control means operable when the carrier means is moved to a desired position in one direction, for controlling the driving means so as to move the carrier means to a position in excess of the desired position and then to move the carrier means to the desired position, the control means controlling the driving means so as to move the carrier means to the desired position without exceeding the desired position when the carrier means is moved to the desired position in a direction opposite to the one direction.

According to the construction as mentioned above, when the carrier means is carried to the desired position in the one direction (e.g. upward with respect to the present position), the carrier means is moved to the position in excess of the desired position and then reversely moved (downward with respect to the exceeded position) to the desired position. On the other hand, when the carrier means is carried to the direction opposite to the one direction (e.g. downward with respect to the present position), the carrier means is moved in the opposite direction (downward) and then moved to the desired position.

Accordingly, in a first case where the carrier means is moved to the desired position which is located in the one direction with respect to the present position, as well as in a second case where the carrier means is moved to the desired position which is located in the direction opposite to the one direction, the carrier means is always moved to the direction opposite to the one direction immediately before the desired position is reached, to thereby carry out its positioning to the desired position.

Therefore, in both the first and second cases, whenever the carrier means finally reaches the desired position, an actuator, such as gears, which is provided for transmitting a driving force of the driving means to the carrier means to convey the same is held to a single side in a fashion being pulled in a predetermined direction according to the driving force of the driving means.

Further, since the actuator is held to the single side, a positioning error of the carrier means with respect to the desired position is made smaller (e.g. reduced to about one half) than dimensional errors present in the actuator such as the gears. Therefore, positioning accuracy of the carrier means to the desired position is improved (e.g. doubled) compared with the conventional technique.

To attain the object, the invention also provides a carrier mechanism having accommodating means and carrier means, for carrying out positioning between the accommodating means and the carrier means, to thereby insert an object carried from the carrier means in to the accommodating means, or take the object accommodated in the accommodating means, out of the accommodating means to the carrier means, the carrier mechanism comprising biasing means for biasing the carrier means in a predetermined direction, driving means for moving the carrier means, and control means operable when the carrier means is moved to a desired position in a biasing direction of the biasing means, for controlling the driving means so as to move the carrier means to a position in excess of the desired position and then to move the carrier means to the desired position while opposing a biasing force of the biasing means.

Further, when the carrier means is moved to the desired position in the direction opposite to the biasing direction of the biasing means, the control means controls the driving means so as to move the carrier means to the desired position without exceeding the desired position while opposing the biasing force of the biasing means.

According to the construction, when the carrier means is moved to the desired position in the biasing direction of the biasing means, the carrier means is moved to the position in excess of the desired position, and thereafter moved to the desired position while opposing the biasing force of the biasing means. When the carrier means is moved to the desired position by opposing the biasing force of the biasing means, the biasing force functions as a load on the driving means for moving the carrier means. As a result, the carrier means is moved by the driving force of the driving means while receiving the biasing force of the biasing means, and therefore influences such as mechanical looseness and plays are suppressed, whereby the carrier means is moved to the desired position with high accuracy.

On the other hand, when the carrier means is moved to the desired position in the direction opposite to the biasing direction of the biasing means, the carrier means is moved to the desired position by always opposing the biasing force of the biasing means. That is, the biasing force always functions as a load on the driving means for moving the carrier means. As a result, the carrier means is moved by the driving force of the driving means while receiving the biasing force of the biasing means, and therefore influences such as mechanical looseness and plays are suppressed, whereby the carrier means is moved to the desired position with high accuracy.

The above and other objects, features and advantages of the invention will be more apparent from the following detailed description taken in conjunction with the accompanying drawings.

DETAILED DESCRIPTION OF THE PREFERRED EMBODIMENTS

The invention will now be described in detail with reference to the drawings showing an embodiment thereof. In the following embodiment, description will be specifically made of a carrier mechanism for an information reproducing apparatus to be mounted in vehicles (hereinafter referred to as "the in-vehicle information reproducing apparatus), which plays back recording media, such as CD's (compact discs) or DVD's (digital versatile discs or digital video discs).

Figure 1:
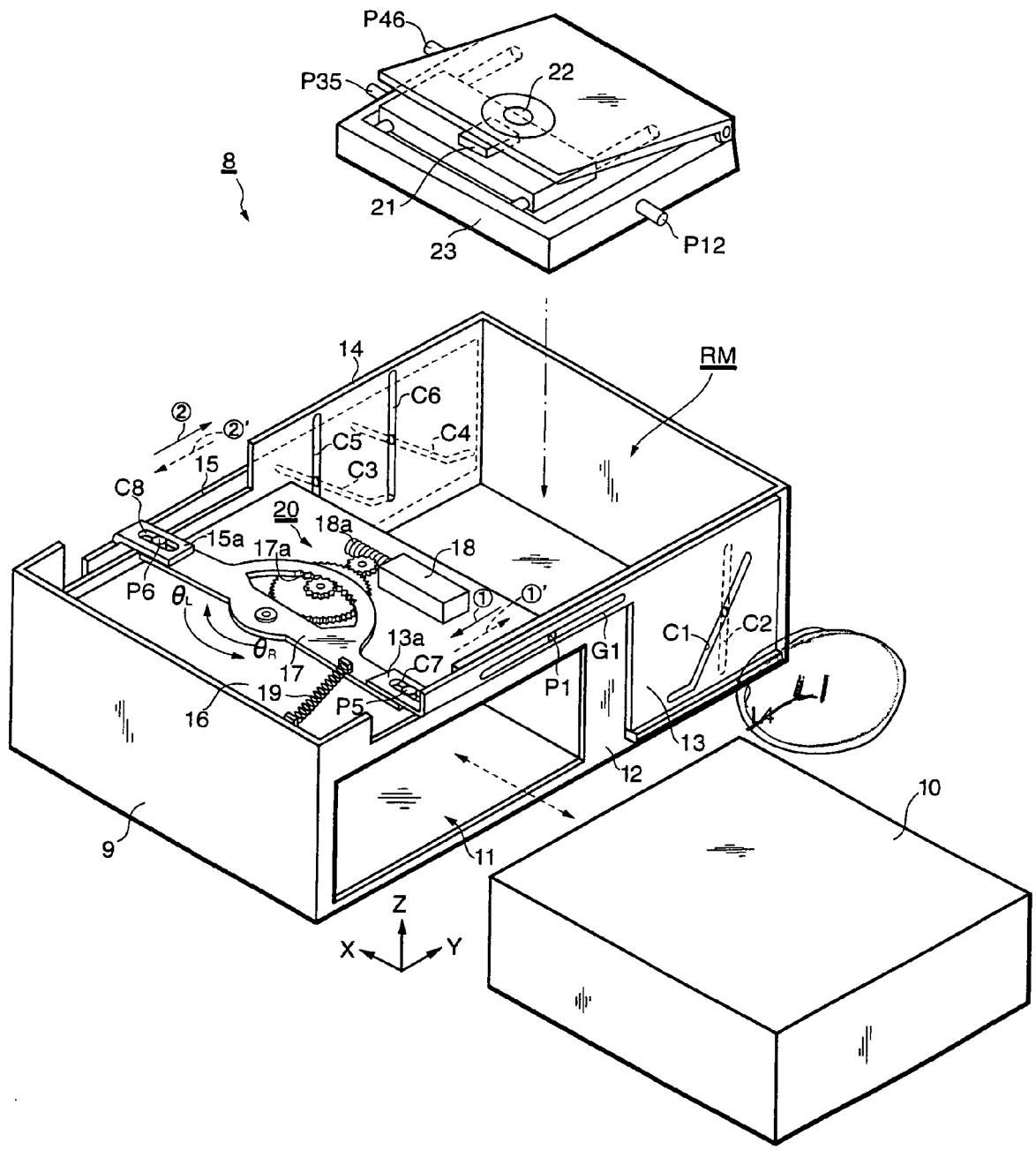
FIG. 1 is an exploded perspective view showing the construction of a carrier mechanism for an information reproducing apparatus, according to an embodiment of the invention.
Figure 2:
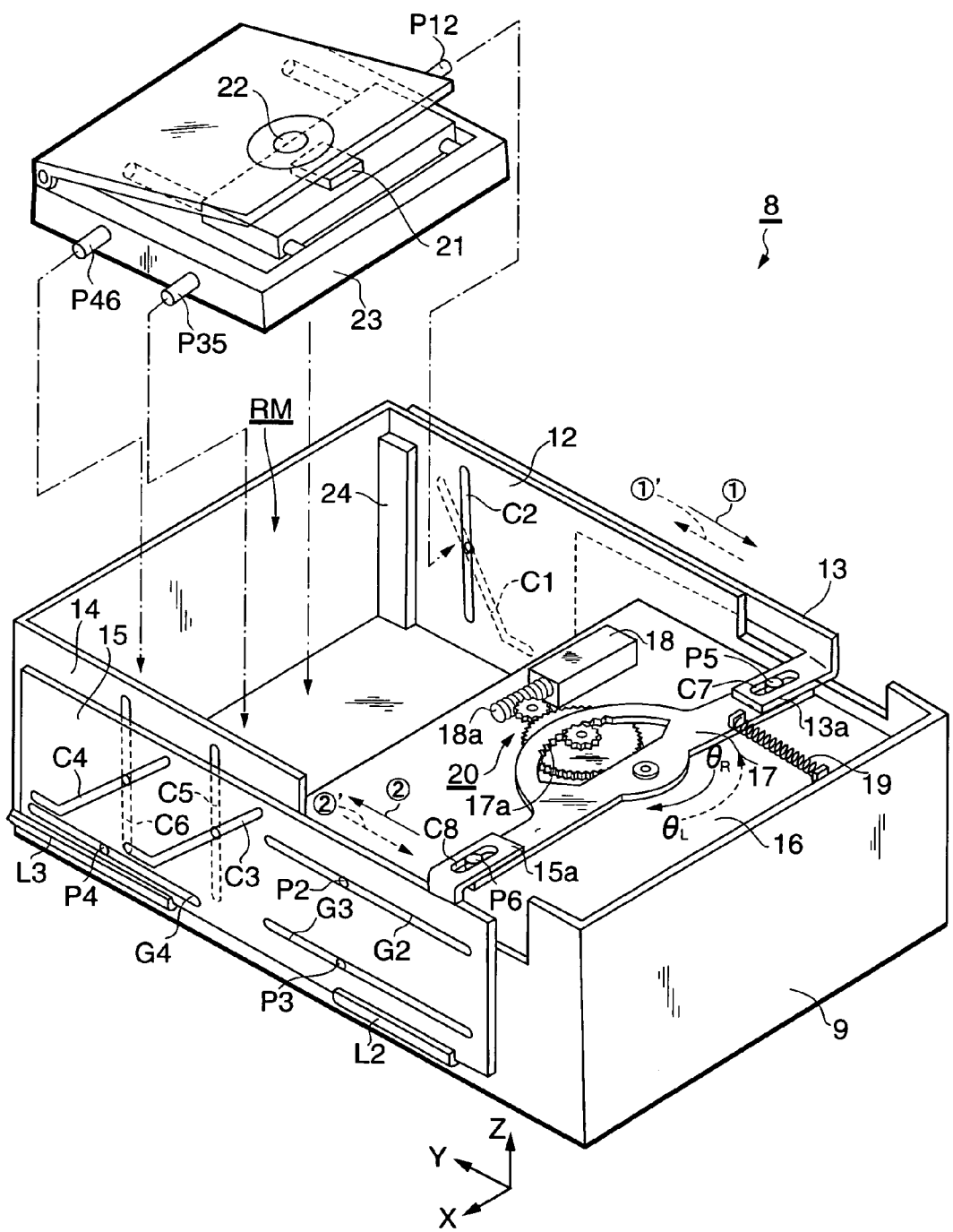
FIG. 2 is an exploded perspective view further showing the construction of the carrier mechanism according to the embodiment.
Figure 3:
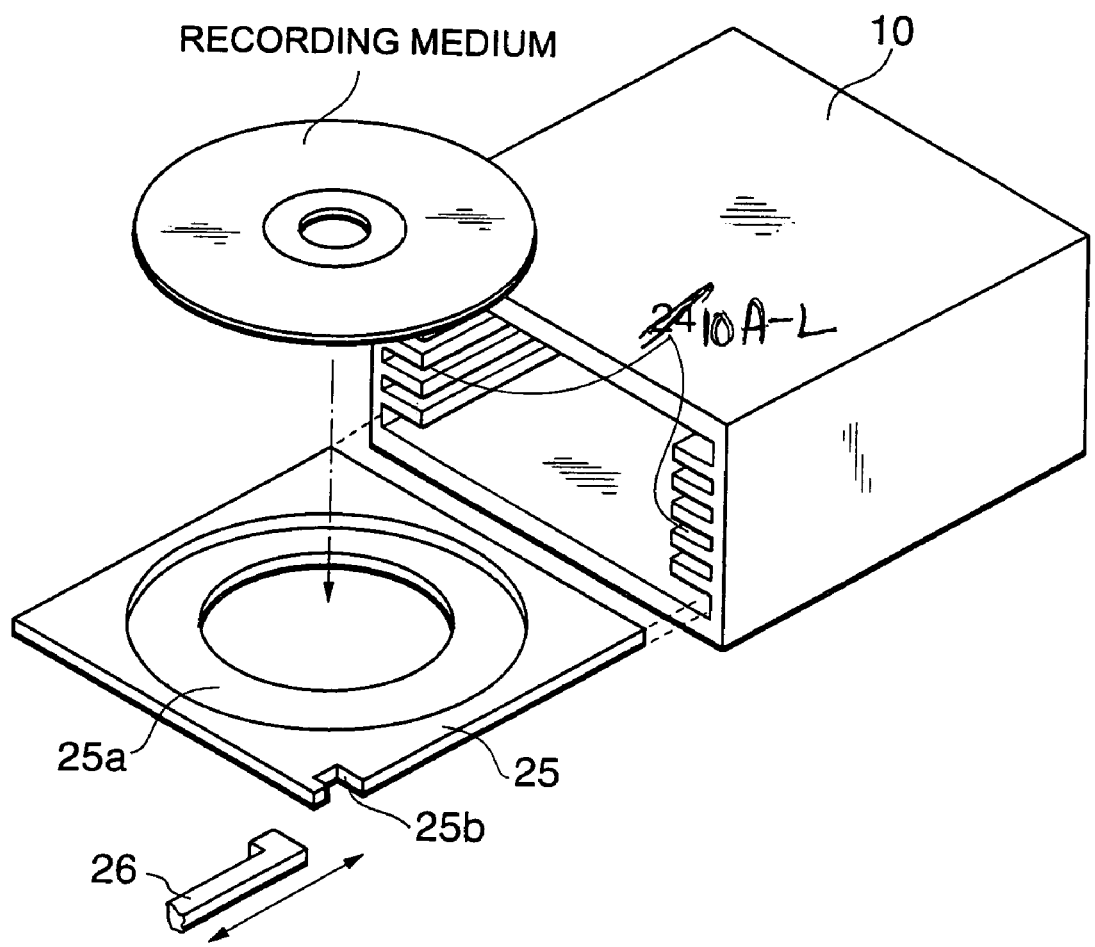
FIG. 3 is a perspective view showing the construction of an accommodating rack applicable to the information reproducing apparatus.

FIGS. 1 and 2 are perspective views each showing the construction of an essential part of an in-vehicle information reproducing apparatus in a disassembled state, in which FIG. 1 shows the information reproducing apparatus as viewed on the side of an operation panel thereof, while FIG. 2 shows the information reproducing apparatus as viewed on the side of a rear surface thereof. In the figures, rectangular coordinates X, Y, and Z represent horizontal directions and a height direction. Further, FIG. 3 is a perspective view showing the construction of a cartridge-type accommodating rack to be inserted into the in-vehicle information reproducing apparatus.

As shown in FIGS. 1 and 2, reference numeral 8 designates an in-vehicle information reproducing apparatus including a box-shaped main body 9 forming a chassis of the apparatus 8. The operation panel side of the main body 9 has an insertion opening 11 formed therein in a fashion extending in the direction of the X-axis, for inserting an accommodating rack 10 of a rectangular parallelepiped shape, in a freely detachable manner.

The main body 9 has a front wall 12 on the operation panel side, on which is arranged an almost L-shaped first cam member 13. On the other hand, the main body 9 has a rear wall 14 on the rear surface, on which is arranged an almost rectangular second cam member 15.

The first cam member 13 has formed therein an elongate guide hole G1 which extends in the direction of the Y-axis, and an elongate cam hole C1 which is slanted at a predetermined angle. The front wall 12 has a fitting projection P1 formed on one side thereof and projecting therefrom. The fitting projection is fitted into the guide hole G1 in a freely slidable manner. Further, the front wall 12 has a guide rail L1 formed at a lower location thereof. The guide rail functions to slidably support the first cam member 13. Thus, the first cam member 13 can reciprocates in the direction of the Y-axis by means of the projection P1 and the guide rail L1.

The front wall 12 further has formed therein an elongate cam hole C2 which intersects the cam hole C1 formed in the cam member 13 and extends in the direction of the Z-axis.

As shown in FIG. 2, the second cam member 15 has formed therein elongate guide holes G2, G3, G4 which extend in the direction of the Y-axis, and elongate cam holes C3, C4 which are slanted at a predetermined angle. The rear wall 14 has fitting projections P2, P3, P4 formed on one side thereof and projecting therefrom, which fitting projections are slidably fitted into the guide holes G2, G3, G4, respectively, in a freely slidable manner. Further, the rear wall 14 has guide rails L2, L3 formed at respective lower locations thereof, which guide rails function to slidably support the second cam member 15. Thus, the second cam member 15 can reciprocate in the direction of the Y-axis by means of the projections P2, P3, P4 and the guide rails L2, L3.

Further, the rear wall 14 has formed therein an elongate cam hole C5 which intersects the cam hole C3 formed in the cam member 15 and extends in the direction of the Z-axis, and an elongate guide hole C6 which intersects the cam hole C4 and extends in the direction of the Z-axis.

An angle at which the cam hole C1 intersects the guide hole C2 is equal to an angle at which the cam hole C3 intersects the guide hole C5, as well as an angle at which the cam hole C4 intersects the guide hole C6. Further, the cam hole C1 is slanted in the direction opposite to the cam holes C3 and C4.

The main body 9 has arranged therein a top board 16 at a location above the insertion opening 11. On the top board is provided a driving mechanism for reciprocating the cam members 13, 15 along the direction of the Y-axis. The driving mechanism is comprised of a lever member 17 supported in a freely rotatable manner, a driving motor 18, a spring 19 always pulling the lever member 17 clockwise by its predetermined elastic force, and a gear mechanism 20 for transmitting the driving force of the driving motor 18 to the lever member 17. The gear mechanism 20 is comprised of a screw gear 18a linked to a driving shaft of the driving motor 18, a gear portion 17a formed on one end of the lever member 17, and a plurality of gears (reference numerals being omitted) engaged with the gears 18a, 17a.

The first and second cam members 13, 15 have tongue-shaped portions 13a, 15a extending therefrom, respectively. The tongue-shaped portions have formed therein cam holes C7 and C8, respectively, into which fitting projections P5, P6 projecting from both ends of the lever member 17 are fitted.

When the lever member 17 is rotated in a clockwise direction $\theta R$ (pulling direction by means of the spring 19) according to the driving force of the driving motor 18, the first cam member 13 is moved in the pulling direction by means of the spring 19 (direction indicated by an arrow 1) in proportion to a rotational quantity of the lever member 17, while the second cam member 15 is moved in the direction opposite thereto (direction indicated by an arrow 2).

On the other hand, when the lever member 17 is rotated in a counterclockwise direction $\theta L$ according to the driving force of the driving motor 18, the first cam member 13 is moved in the direction of an arrow 1' opposite to the direction of the arrow 1 in proportion to a rotational quantity of the lever member 17, while the second cam member 15 is moved in the direction of an arrow 2' opposite to the direction of 2.

The main body 9 has a room portion RM formed therein and adjacent to the insertion opening 11, in which is arranged a carrier section 23 which mounts thereon a pickup 21 for optically reading information recorded on a recording media such as CD's and DVD's, and a clamping mechanism 22 for clamping the recording media.

The carrier section 23 has guide projections P12, P35, P46 projecting from both edges thereof. The guide projection P12 is fitted into an intersection between the cam hole C1 and the guide hole C2, the guide projection P35 an intersection between the cam hole C3 and the guide hole C5, and the guide projection P46 an intersection between the cam hole C4 and the guide hole C6, respectively.

Further arranged in the main body 9 is a potentiometer 24 which is DC-biased to a predetermined voltage. The potentiometer 24 has its sliding terminal 24a (see FIG. 4) connected to one edge of the carrier section 23.

Referring to FIG. 3, the accommodating rack 10 has a plurality of accommodating slots 10A–L formed therein in layers, which each accommodate a single tray 25 in a removable manner. Each tray 25 has formed therein a circular depression 25a in which the recording medium such as a CD and a DVD is mounted, and a notch 25b. Then, the plurality of trays 25 are accommodated in the accommodating slots 10A–L, and the accommodating rack 10 is inserted into the insertion opening 11 such that an open side thereof faces the carrier section 23.

In this manner, when the accommodating rack 10 is inserted into the insertion opening 11, each tray 25 faces the side of the carrier section 23. Then, the carrier section 23 moves in the height direction (Z direction) to a desired position of the accommodating rack 10, and an actuator (not shown) mounted on the carrier section 23 actuates an engaging lever 26 so as to engage with the notch 25b of the tray 25 at the desired position, and then moves the engaging lever 26 so as to be separated from the accommodating rack 10. Thus, the tray 25 is pulled to the side of the clamping mechanism, whereby the recording medium is clamped. Further, the clamping mechanism rotates the recording medium, and the pickup 21 reads out the information recorded on the recording medium, to thereby play back the information.

Further, when the engaging lever 26 engages with the notch 25b of the tray 25 at the clamped position and moves the tray 25 toward the side of the accommodating slot 10A–L at the desired position, the tray 25 is inserted into the accommodating slot 10A–L at the desired position.

Figure 4:
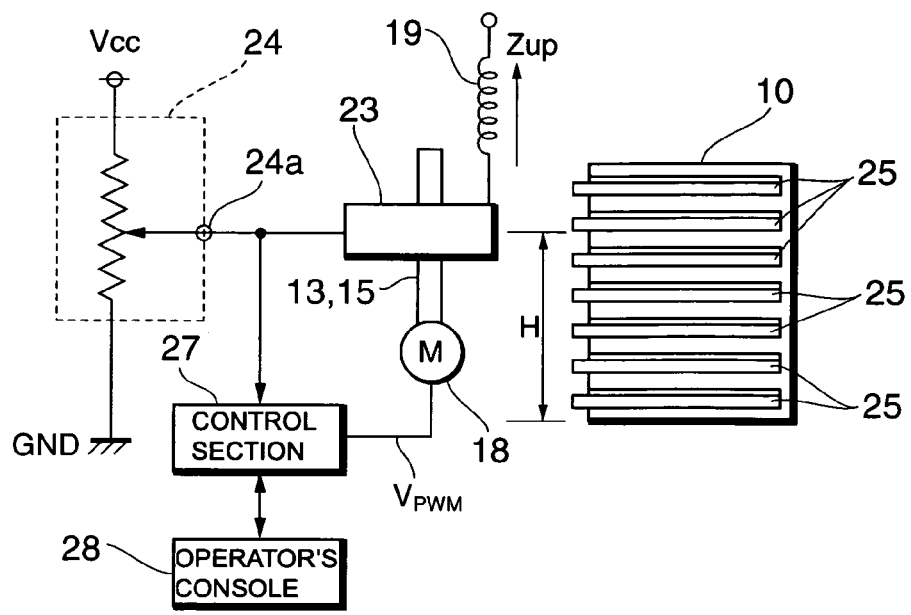
FIG. 4 is a conceptual representation schematically showing the arrangement of the carrier mechanism.

Next, description will be made of an essential operation of the carrier mechanism for moving the carrier section 23 up and down in the height direction, with reference to FIGS. 4 to 7. FIG. 4 is a conceptual representation schematically showing the arrangement of the carrier mechanism. In the figure, as described hereinabove, the guide projections P12, P35, P46 protruding from the edges of the carrier section 23, are fitted into the intersections between the cam holes C1, C3, C4 and the guide holes C2, C5, C6, respectively, whereby the carrier section 23 is supported by the cam members 13 and 15. These cam members 13, 15 progress and retrieve depending on the driving force of the driving motor 18, and accordingly, the positions of the intersections between the respective guide holes C2, C5, C6 and the cam holes C1, C3, C4, are relatively shifted, which changes the height H of the carrier section 23. Therefore, the relative position between the accommodating slot 25 formed in the accommodating rack 10 and the carrier section 23 is changed.

Figure 5:
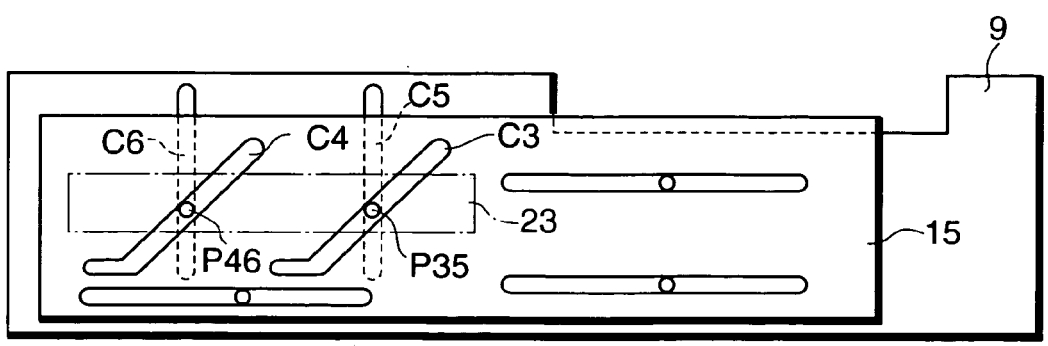
FIG. 5 is a side view which is useful in explaining carrying principles of the carrier mechanism.
Figure 6:
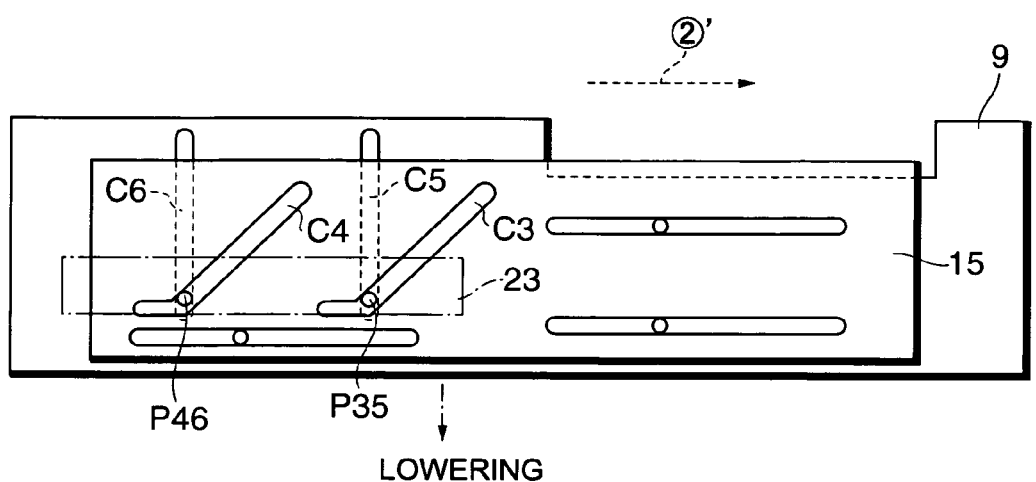
FIG. 6 is a side view which is useful in further explaining the carrying principles of the carrier mechanism.
Figure 7:
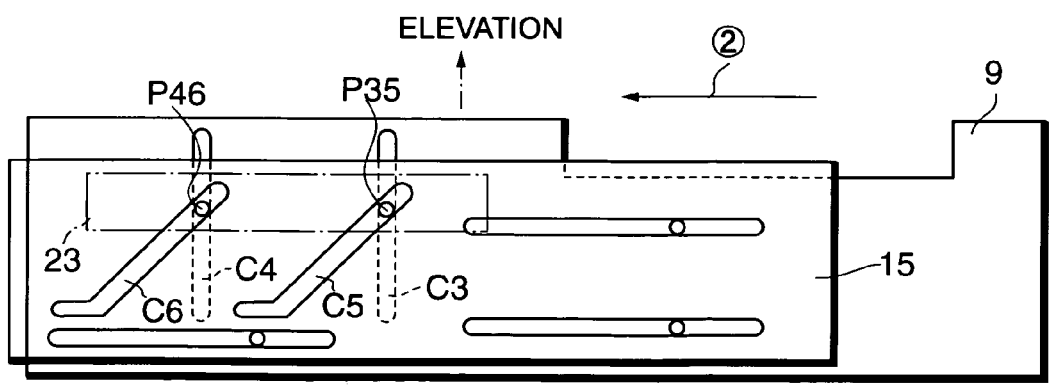
FIG. 7 is a side view which is useful in further explaining the carrying principles of the carrier mechanism.

More specifically, as shown in side views of FIGS. 5 to 7, when the cam member 15 is shifted in the direction of the accommodating rack 10 (direction indicated by the arrow 2'), the positions of the intersections between the respective guide holes C5, C6 and the cam holes C3, C4 are lowered, and accordingly the guide projections P35, P46 are lowered, leading to lowering of the carrier section 23. On the other hand, when the cam member 15 is shifted in the direction that leaves the accommodating rack 10, the positions of the intersections between the respective guide holes C5, C6 and the cam holes C3, C4 are elevated, and accordingly the guide projections P35, P46 are elevated, leading to elevation of the carrier section 23. In regard of this point, the intersection (not shown in FIGS. 5 to 7) between the guide hole C2 and the cam hole C1 is shifted up and down according to the movement of the cam member 13. Therefore, the carrier section 23 is moved up and down by the cam members 13, 15 which are moved in the opposite directions to each other.

Referring again to FIG. 4, the carrier mechanism is provided with a control section 27 for controlling the rotational direction and the rotational quantity of the driving motor 18 and an operator's console 28 through which the user or the like provides a desired instruction to the control section 27. The control section 27 has a microprocessor which controls the driving motor 18 by executing a system program preset beforehand.

The microprocessor is supplied with a divided voltage VR generated at the sliding terminal 24a of the potentiometer 24, which is linked to the edge of the carrier section 23, by way of an A/D converter (not shown). Thus, the microprocessor detects the height H of the present position of the carrier section 23, based on the divided voltage value. Further, when the carrier section 23 is moved to the desired position, a driving voltage (power) $V_{PWM}$ which has been pulse-duration modulated is supplied from the microprocessor to the driving motor 18, whereby the rotational direction and the rotational quantity of the driving motor 18 are controlled. Connected to both ends of the potentiometer 24 are a power terminal Vcc at a predetermined voltage and a grounding terminal GND, whereby the potentiometer is DC-biased.

Further, as shown in FIGS. 1 and 2, the spring 19 pulls the lever member 17 in the predetermined direction As a result, as conceptually illustrated in FIG. 4, the cam members 13, 15 disposed between the driving motor 18 and the carrier section 23, and the gear mechanism 20 are always biased in the direction that receives an elastic force of the spring 19. More specifically, in the present embodiment, they are always biased in a direction Zup that elevates the carrier section 23.

Next, the operation of the carrier mechanism having the construction described above will be more specifically described by way of example, with reference to FIGS. 8 to 14.

Figure 8:
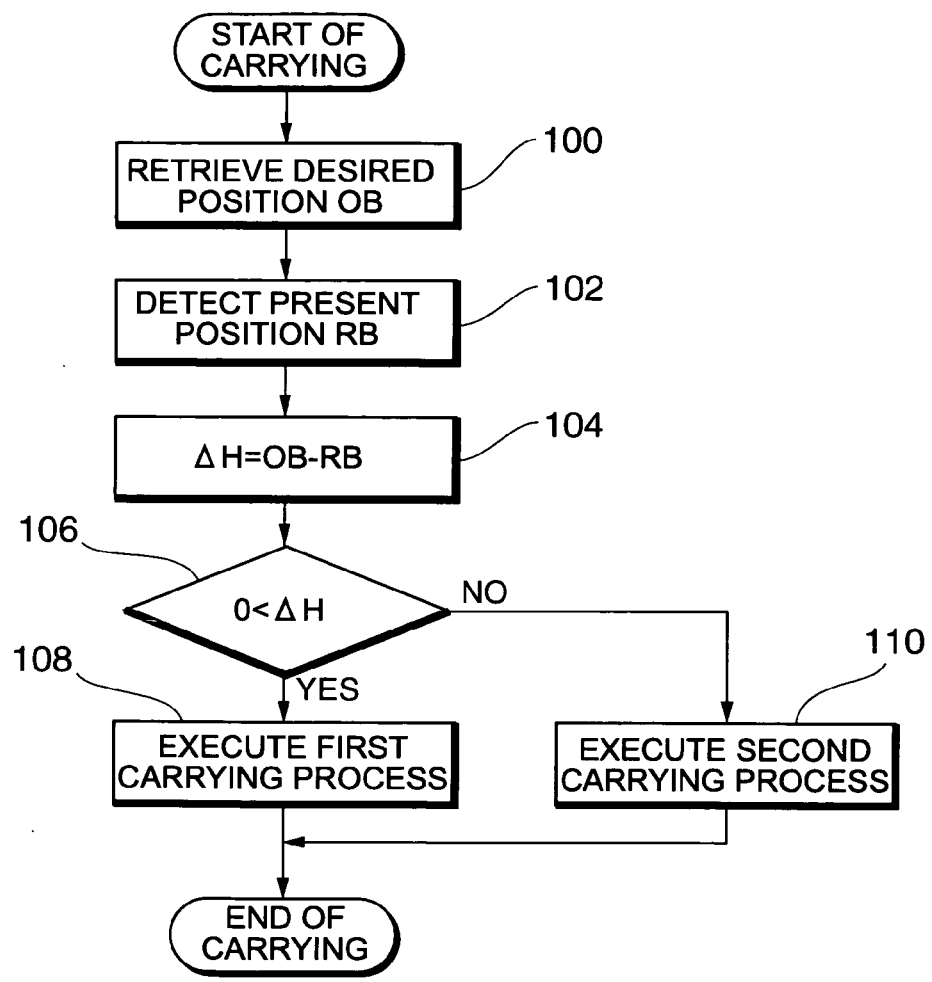
FIG. 8 is a flowchart showing a program which is useful in explaining the operation of the carrier mechanism.

Referring first to FIG. 8, when an instruction is provided, by the user or the like, in order to play back the desired recording medium, a carrying process is started. First, a position OB of the accommodating tray 25 which accommodates therein the designated recording medium is retrieved from a control memory (not shown) stored in the microprocessor, at a step 100, and then a present position RB of the carrier section 23 is detected based on the divided voltage VR, at a step 102.

Then, a difference ΔH between the position of accommodation (hereinafter referred to as "the desired position") OB and the present position RB is obtained, and the thus obtained difference ΔH is set as a distance to be moved, at a step 104. Next, a determination process is executed at a step 106, i.e. it is determined whether or not the difference ΔH is a positive value. If the difference ΔH is positive, i.e. if the answer to the question of the step 106 is affirmative (YES), the program proceeds to a step 108, wherein a first carrying process is carried out, which means that the carrier section 23 is moved upward with respect to the present position RB. On the other hand, if the difference Δ H is negative, i.e. if the answer to the question of the step 106 is negative (NO), the program proceeds to a step 110, wherein a second carrying process is carried out, which means that the carrier section 23 is moved downward with respect to the present position RB. After completion of the first or second carrying process, the accommodating tray 25 in the accommodating rack 10 at the desired position OB is pulled out, and the recording medium mounted on the accommodating tray 25 is clamped in the clamping mechanism 22 of the carrier section 23, to thereby carry out reproduction of information by means of the pickup 21.

When the recording medium during playback is accommodated in the accommodating slot 24 at the desired position OB, the carrying process is carried out in the same manner.

Figure 9:
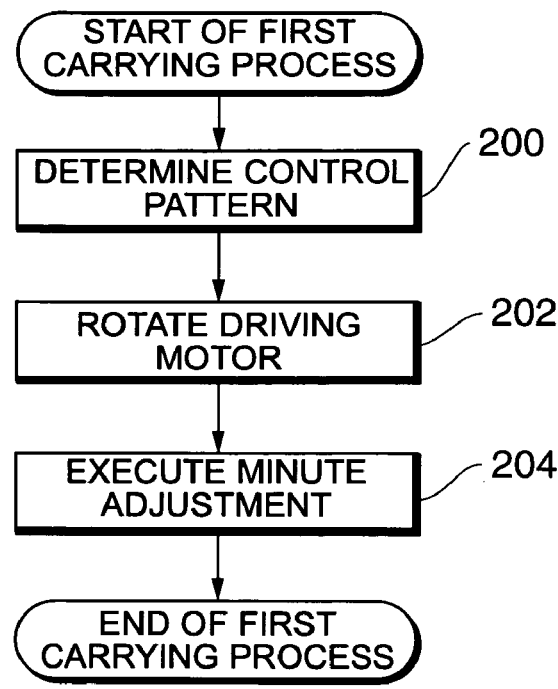
FIG. 9 is a flowchart showing a subroutine for carrying out a first carrying process which is executed at a step 108 in FIG. 8.

The first carrying process (step 108) is executed according to a sub-routine shown in FIG. 9. First, at a step 200, a pattern of controlling the driving voltage $V_{PWM}$ to be supplied to the driving motor 18 is determined based on the absolute value |ΔH| of the above difference.

More specifically, according to the present embodiment, the carrier section 23 is moved at an accelerated rate over a time period τ1 from an initial activation (a first control mode), and then moved to a position close to the desired position OB at a decelerated rate over the following time period τ2 (a second control mode), followed by executing minute adjustment over the final time period τ3 (a third control mode). By virtue of these control modes, the carrier section 23 can be positioned and stopped at the desired position OB with extremely high accuracy. Further, the time periods τ1 and τ2 over which the carrying processes in the first and second control modes are executed, respectively, are adjusted depending on the distance |ΔH| between the present position RB and the desired position OB, to thereby carry out the carrying process at high speed with high accuracy.

In regard of this point, data of the time periods τ1 and τ2 with respect to the distance |ΔH| may be stored in a so-called lookup table beforehand, so that values of the time periods τ1 and τ2 can be determined by retrieving the lookup table. Alternatively, a predetermined function representative of the relationship between the distance |ΔH| and the time periods τ1 and τ2 may be set beforehand, so that values of the time periods τ1 and τ2 can be calculated by substituting the actually measured distance |ΔH| into the function.

Next, at a step 202, the driving voltage $V_{PWM}$ is supplied to the driving motor 18 for rotating the same, and therefore the carrier section 23 is moved to the desired position OB.

Figure 10:
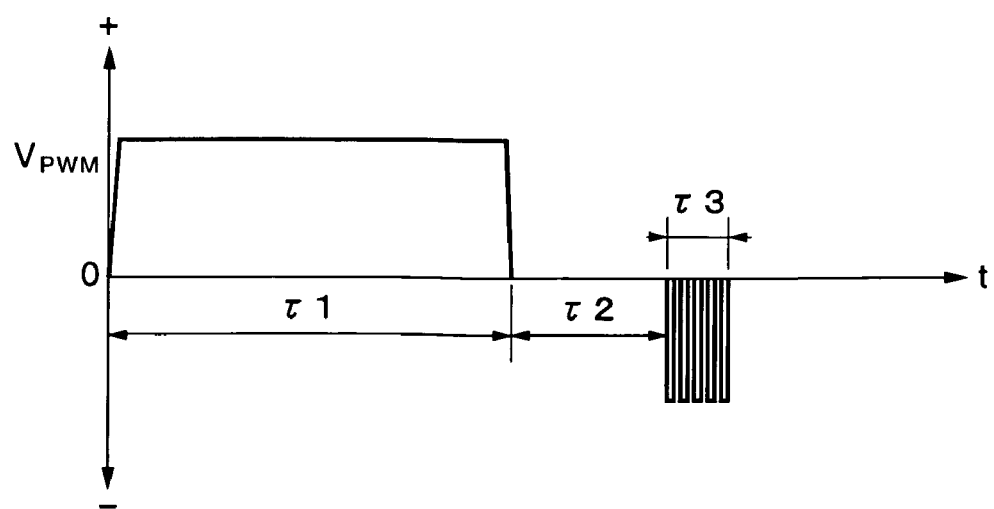
FIG. 10 is a waveform diagram showing changes of a driving signal supplied to a driving motor during the first carrying process.

As shown in a waveform diagram of FIG. 10, over the time period τ1 in the first control mode, the carrier section 23 is accelerated by setting the driving voltage $V_{PWM}$ to a positive DC voltage with a predetermined amplitude. Further, the position of the carrier section 23 on the move is detected point by point, based on the divided voltage VR generated at the potentiometer 24, and when the carrier section 23 reaches a position which exceeds a positive allowable tolerance +ΔW with respect to the desired position OB, the mode for controlling the carrier section 23; is changed to the second control mode. Over the time period τ2 in the second control mode, the driving motor 18 is braked by setting the driving voltage $V_{PWM}$ to 0 volt, to thereby decelerate the carrier section 23. In this manner, by controlling the carrier section 23 according to the first and second control modes, the carrier section 23 is moved to a position H1 which is slightly higher than the desired position OB, as shown in an operational property graph of FIG. 11.

Figure 11:
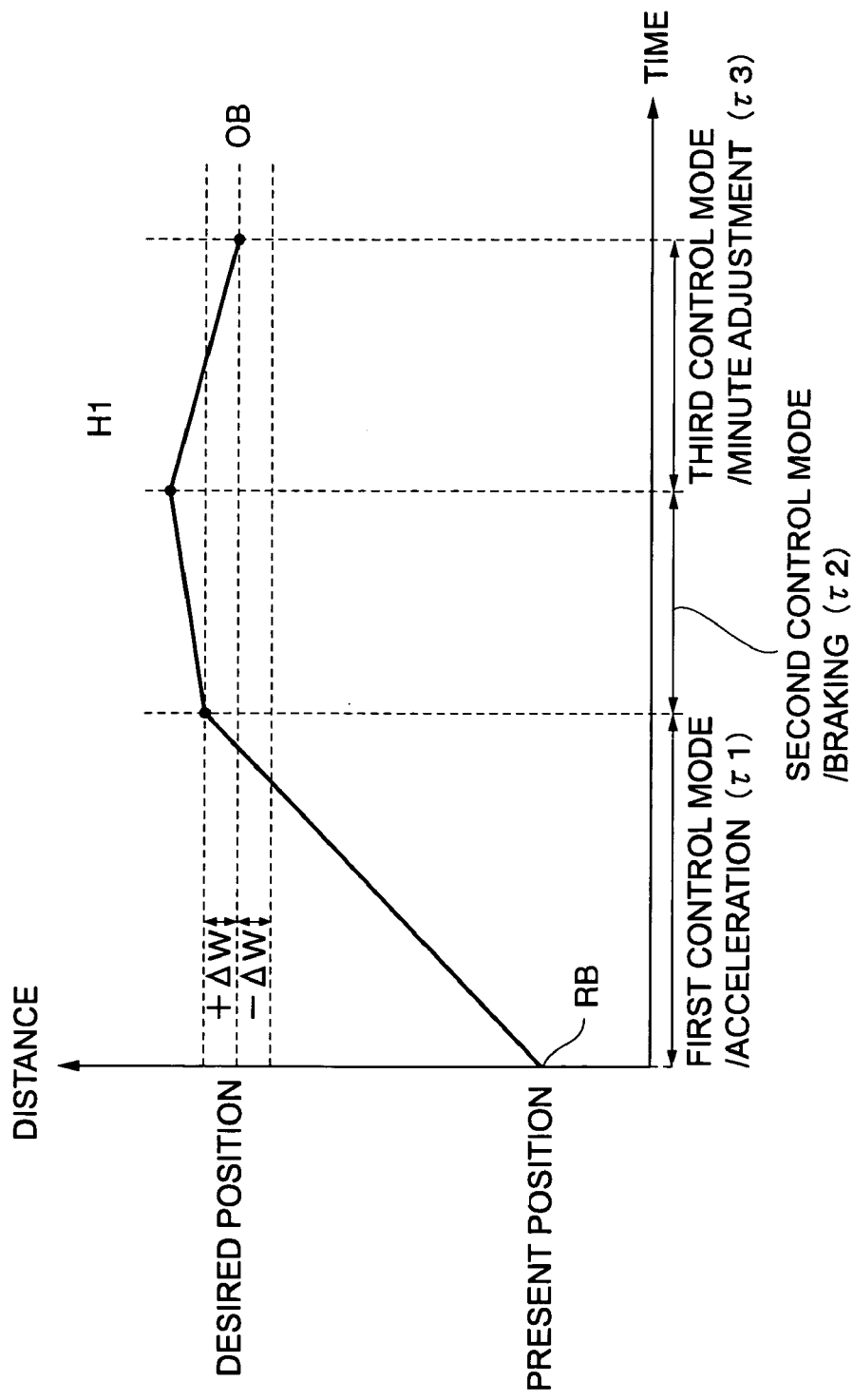
FIG. 11 is a graph showing the operational property of the carrier section during the first carrying process.

Then, at a step 204, the carrier section 23 is set to the third mode in which the minute adjustment of the position is executed. Over the time period τ3 in the third mode, as shown in FIG. 10, the driving voltage $V_{PWM}$ is inverted in sign, and further set to pulsed rectangular waves. Thus, the driving motor 18 is reversely rotated, and accordingly the carrier section 23 falls from the position at the height H1 to the desired position OB with an extremely small resolution. Further, the position of the carrier section 23 on the move is detected point by point, based on the divided voltage VR generated at the potentiometer 24. As shown in FIG. 11, when the carrier section 23 reaches a position within a range of the allowable tolerance ±ΔW with respect to the desired position OB, supply of the driving voltage $V_{PWM}$ is terminated, whereby the carrier section 23 is rested. Thus, the carrying process is completed.

In this manner, according to the first carrying process (at the step 108), the carrier section 23 is elevated to the position exceeding the desired position OB, followed by executing the minute adjustment to lower the same to the desired position OB. Therefore, during the minute adjustment, the carrier section 23 is lowered against the biasing force of the spring 19.

As a result, during the minute adjustment, all of the component elements contributing to carrying and driving of the carrier section 23, such as the cam members 13, 15 and the gear mechanism 20, are biased by the biasing force of the spring 19, and hence they are aligned (held to one side) in the direction of the biasing force. The carrier section 23 is moved down under such a condition while opposing the biasing force. Therefore, even if the cam members 13, 15, the gear mechanism 20, etc. have dimensional errors such as mechanical plays and looseness, these errors can be substantially suppressed by a balance between the biasing force of the spring 19 and the driving force of the driving motor 18. As a result, the carrier section 23 can be positioned to the desired position with high accuracy.

Figure 12:
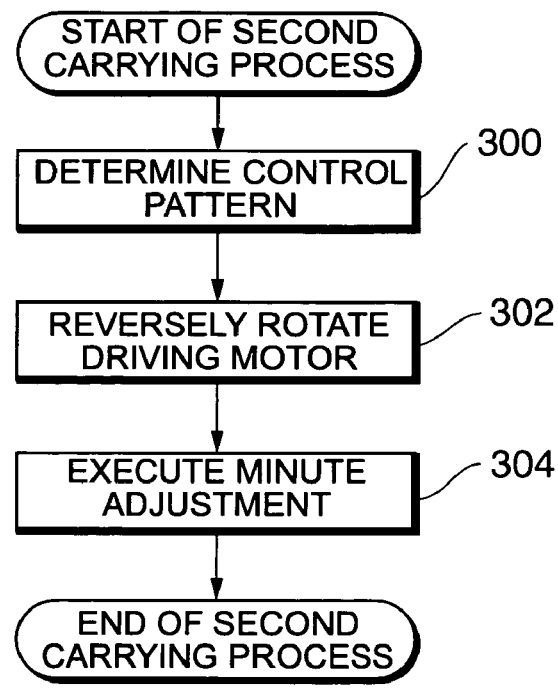
FIG. 12 is a flowchart showing a subroutine for carrying out a second carrying process which is executed at a step 110 in FIG. 8.

Next, the second carrying process (step 110) shown in FIG. 8 is executed according to a subroutine of FIG. 12. First, at a step 300, a pattern of controlling the driving voltage $V_{PWM}$ to be supplied to the driving motor 18 is determined based on the absolute value |ΔH| of the above difference.

More specifically, when the carrier section 23 is lowered to the desired position OB as well, the first to third control modes are set in the same manner as in elevation of the carrier section 23, and the waveform of the driving voltage $V_{PWM}$ is controlled in each mode. Further, a lookup table set beforehand is retrieved to set the time periods τ1 and τ2 over which carrying processes in the first and second control modes are executed, respectively. Alternatively, the difference |ΔH| between the present position RB and the desired position OB is substituted into a predetermined function, to thereby set the time periods τ1 and τ2.

Then, at a step 302, the driving voltage $V_{PWM}$ is supplied to the driving motor 18 to reversely rotate the same, whereby the carrier section 23 is moved toward the desired position OB which is positioned below the present position.

Figure 13:
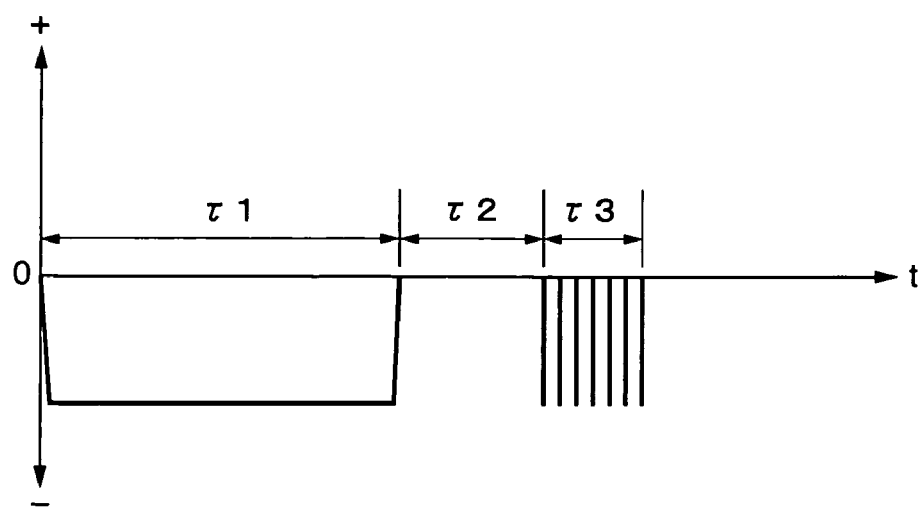
FIG. 13 is a waveform diagram showing changes of a driving signal supplied to the driving motor during the second carrying process.

As shown in a waveform diagram of FIG. 13, over the time period τ1 in the first control mode, the carrier section 23 is accelerated by setting the driving voltage $V_{PWM}$ to a negative DC voltage with a predetermined amplitude. Further, the position of the carrier section 23 on the move is detected point by point, based on the divided voltage VR generated at the potentiometer 24, and when the carrier section 23 reaches a point in the vicinity of and slightly short of the desired position OB, the mode for controlling the carrier section 23 is changed to the second control mode. Over the time period τ2 in the second control mode, the driving motor 18 is braked by setting the driving voltage $V_{PWM}$ to 0 volt, to thereby decelerate the carrier section 23. In this manner, by controlling the carrier section 23 according to the first and second control modes, the carrier section 23 is moved to a position H2 which is slightly short of the desired position OB, as shown in an operational property graph of FIG. 14.

Then, at a step 304, the carrier section 23 is set to the third mode in which the minute adjustment of the position is executed. Over the time period τ3 in the third mode, as shown in FIG. 13, the driving voltage $V_{PWM}$ is set to a pulsed rectangular waveform while its sign being kept to a minus value. Thus, the driving motor 18 continues to be reversely rotated, and accordingly the carrier section 23 is moved down from the position at the height H2 to the desired position OB with a extremely small resolution.

Figure 14:
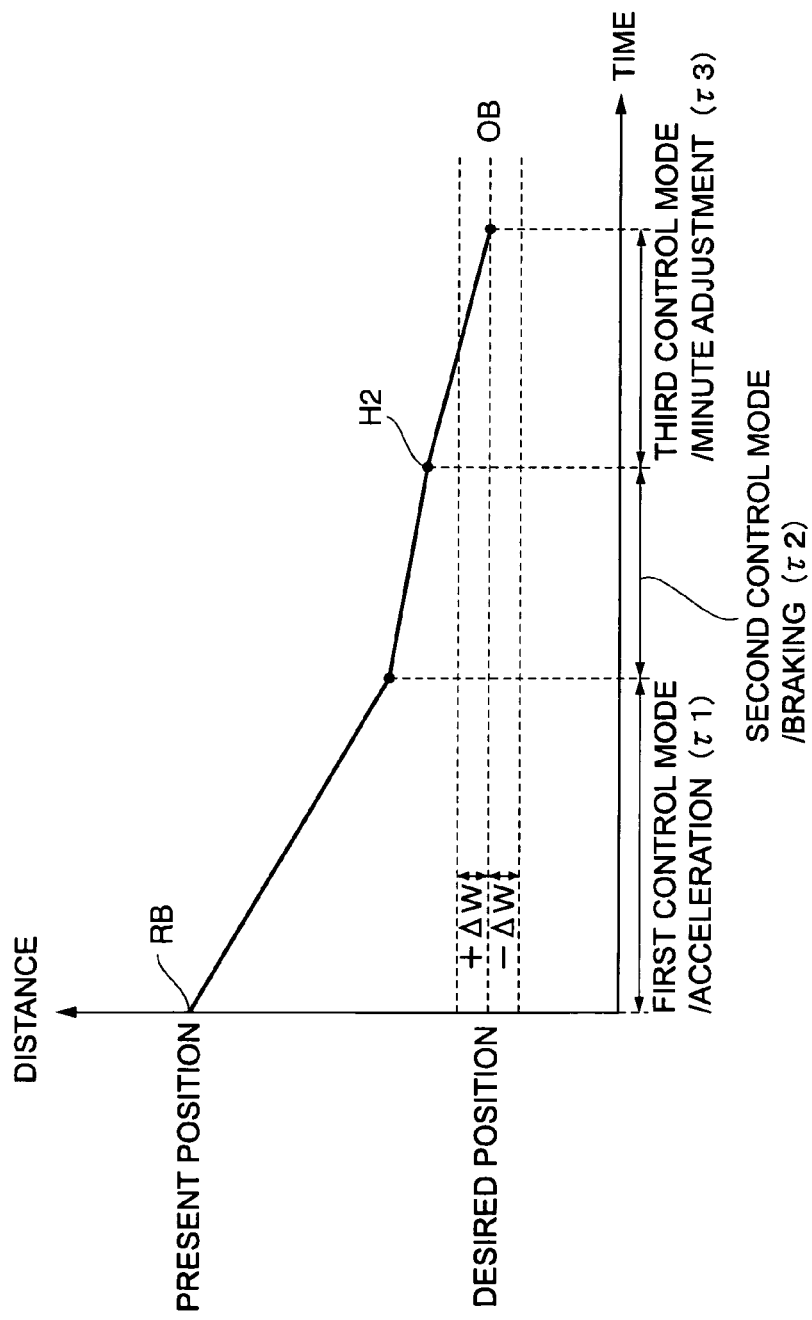
FIG. 14 is a graph showing the operational property of the carrier section during the second carrying process.

Further, the position of the carrier section 23 on the move is detected point by point, based on the divided voltage VR generated at the potentiometer 24. As shown in FIG. 14, when the carrier section 23 reaches a position which is within the range of the allowable tolerance ±ΔW with respect to the desired position OB, supply of the driving voltage $V_{PWM}$ is terminated, whereby the carrier section 23 is rested. Thus, the carrying process is completed.

In this manner, according to the second carrying process (step 110), by continuously lowering the carrier section 23 until it reaches the desired position OB, the carrier section 23 can be moved to the desired position OB with high accuracy.

More specifically, when the carrier section 23 is lowered, all of the component elements contributing to carrying and driving of the carrier section 23, such as the cam members 13, 15 and the gear mechanism 20, are biased by the biasing force of the spring 19, and hence they are aligned (held to one side) in the direction of the biasing force. The carrier section 23 is moved down under such a condition while opposing the biasing force. Therefore, even if the cam members 13, 15, the gear mechanism 20, etc. have dimensional errors such as mechanical plays and looseness, these errors can be substantially suppressed by a balance between the biasing force of the spring 19 and the driving force of the driving motor 18. As a result, the carrier section 23 can be positioned to the desired position with high accuracy.

As described hereinabove, according to the present embodiment, all the component elements contributing to carrying and driving of the carrier section 23 are biased by the spring 19 in the predetermined direction, and the carrier section 23 is moved to the desired position OB under such a condition, i.e. by opposing the biasing force of the spring 19, which makes it possible to suppress the dimensional errors etc.

As a result, the accommodating tray 25 accommodated in the accommodating rack 10 and the carrier section 23 are positioned to each other with high accuracy, which enables the accommodating tray 25 and the recording medium mounted thereon to be smoothly taken out of the accommodating rack 10 or to be smoothly inserted into the accommodating rack 10.

Figure 15:
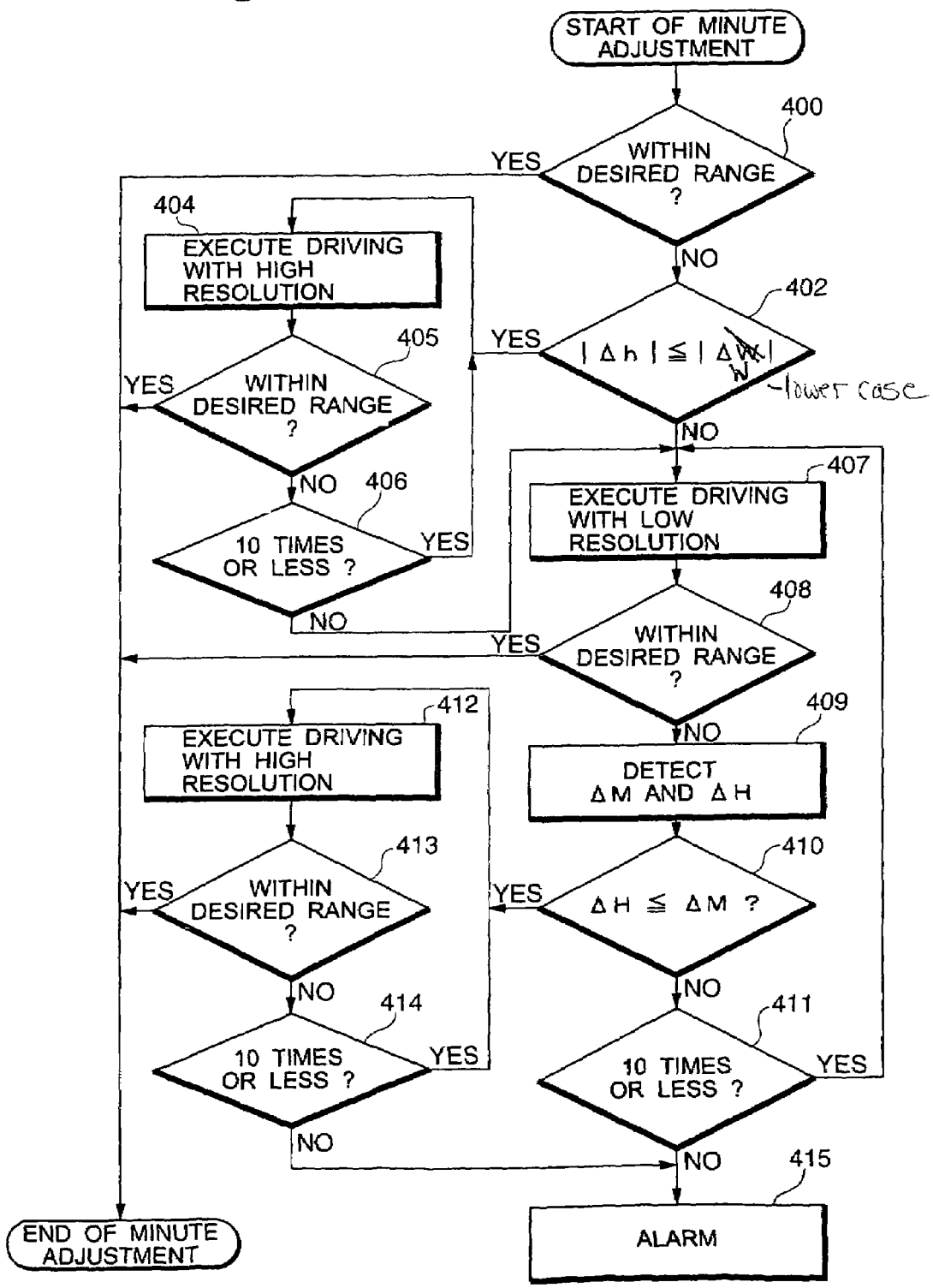
FIG. 15 is a flowchart showing a subroutine for carrying out minute adjustment in the first or second carrying process, which is executed at a step 204 in FIG. 9 or at a step 304 in FIG. 12.
Figure 16A:
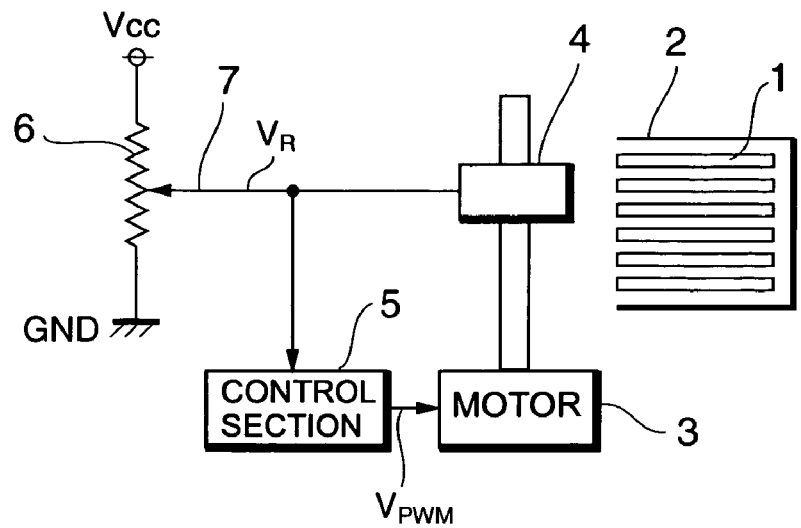
FIG. 16A is a schematic diagram showing the arrangement of a conventional carrier mechanism.
Figure 16B:
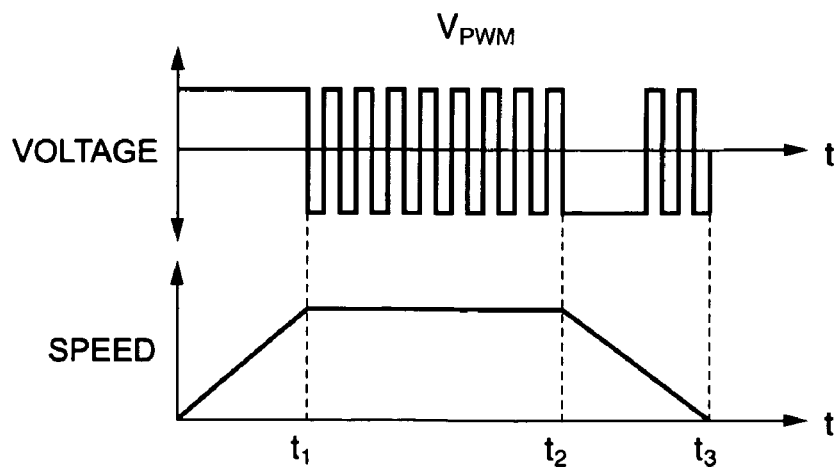
FIG. 16B is a timing chart useful in explaining the operation of the conventional carrier mechanism.

Alternatively, the above minute adjustment may be more accurately executed according to a subroutine shown in FIG. 15. The subroutine of FIG. 15 is applicable to a case where the carrier section 23 is moved to the desired position OB which is higher than the present position RB, and a case where the carrier section 23 is moved to the desired position OB which is lower than the present position RB.

When the process at the step 204 in FIG. 9 or the step 304 in FIG. 12 is started, it is determined at a step 400 in FIG. 15 whether or not the carrier section 23 has already reached the range of the allowable tolerance ±ΔW with respect to the desired position OB. If the carrier section 23 has already reached the allowable tolerance range ±ΔW with respect to the desired position OB, the minute adjustment is immediately completed.

On the other hand, if the carrier section 23 is out of the allowable tolerance range ±ΔW with respect to the desired position OB, a difference (distance) Δh between the desired position OB and an actually reached position by the carrier section 23 is calculated ta step 402, and then it is determined whether or not the difference Δh is equal to or smaller than a set range ΔW which has been determined beforehand. In regard of this point, the absolute value |ΔW| of the set range ΔW and the absolute value |ΔW| of the allowable tolerance ΔW are set in a relationship of |ΔW|<|ΔW|.

If it is determined that the difference |Δh| is equal to of smaller than the set range |ΔW|, the program proceeds to steps 404 to 406. Herein, the driving motor 18 is subjected to reverse rotation and braking with high resolution over a very short time period, at the step 404, and then it is determined at the step 405 whether or not the carrier section 23 has reached the allowable tolerance range ±ΔW with respect to the desired position OB, by detecting the divided voltage RV at the potentiometer 24 point by point. Then, at the step 406, the number of times of execution of these steps is counted up to 10 times until the carrier section 23 reaches the allowable tolerance range ±ΔW with respect to the desired position OB. If it is determined at the step 405 that the carrier section 23 has reached the allowable tolerance range ±ΔW with respect to the desired position OB, the minute adjustment is completed.

On the other hand, if it is determined at the step 406 that the carrier section 23 does not reach the allowable tolerance range ±ΔW with respect to the desired position OB even after execution of the steps 10 times, the program proceeds to a step 407. Further, if the difference Δh is larger than the set range ΔW at the step 402, the program proceeds to the step 407, as well.

At the step 407, the driving motor 18 is subjected to reverse rotation and braking with resolution slightly lower than the resolution at the steps 404 to 406, over a very short time period, and then it is determined at a step 408 whether or not the carrier section 23 has reached the allowable tolerance range ±ΔW with respect to the desired position OB, by detecting the divided voltage VR at the potentiometer 24 point by point. If it is determined that the carrier section 23 has reached the allowable tolerance range ±ΔW with respect to the desired position OB, the minute adjustment is completed.

On the other hand, if the carrier section 23 has not reached the allowable tolerance range ±ΔW with respect to the desired position OB, the program proceeds to a step 409. At the step 409, a distance (moved distance) ΔM over which the carrier section 23 has moved by the process of the step 407 is detected based on a change in the divided voltage VR. Further, a currently remaining distance ΔH between the present position of the carrier section 23 and the desired position OB is detected based on the divided voltage VR.

Then, a relationship between the moved distance ΔM and the remaining distance ΔH is determined at a step 410. If ΔH≦ΔM does not hold, the steps 407 to 410 are repeatedly executed while the number of times of execution is counted at a step 411. The step 411 is set such that the steps 407 to 410 can be repeatedly executed up to 10 times.

If ΔH>ΔM holds even after execution of the steps 407 to 411 10 times, the program proceeds from the step 411 to a step 415. Then, it is determined at the step 415 that some kind of abnormality has occurred, and therefore the carrying process is terminated, followed by lighting an alarm lamp, not shown, or the like, to thereby notify the user or the like of the abnormality.

On the other hand, if it is determined at the step 410 that ΔH≦ΔM holds, the program proceeds to steps 412 to 414 which are similar to the steps 404 to 406. More specifically, at the step 412, the driving motor 18 is subjected to reverse rotation and braking with high resolution over a very short time period, and then it is determined at the step 413 whether or not the carrier section 23 has reached the allowable tolerance range ±ΔW with respect to the desired position OB, by detecting the divided voltage VR at the potentiometer 24 point by point. Then, at the step 414, the number of times of execution of these steps is counted up to 10 times until the carrier section 23 reaches the allowable tolerance range ±ΔW with respect to the desired position OB. If it is determined at the step 413 that the carrier section 23 has reached the allowable tolerance-range ±ΔW with respect to the desired position OB, the minute adjustment is completed. On the other hand, if it is determined at the step 414 that the carrier section does not reach the allowable tolerance range ±ΔW with respect to the desired position OB even after execution of these steps 10 times, the program proceeds to the step 415. Then, the carrying process is terminated, followed by lighting the alarm lamp, not shown, or the like, to thereby notify the user or the like of occurrence of the abnormality.

In this manner, if the minute adjustment is executed according to the program of FIG. 15, the carrier section 23 can be more specifically moved to the desired position, depending on the position actually assumed by the carrier section 23 after being controlled according to the first and second control modes.

More specifically, after execution of the carrying process according to the first and second control modes, if the carrier section 23 has reached a position relatively close to the desired position OB, the minute adjustment with high resolution is executed, at the steps 404 to 406.

On the other hand, after execution of the carrying process according to the first and second control mode, if the carrier section 23 has reached a position relatively separate from the desired position OB, the minute adjustment with low resolution is executed, at the steps 407 to 411.

Further, after execution of the carrying process with low resolution at the steps 407 to 411, if the carrier section 23 has reached a position relatively close to the desired position OB, the minute adjustment with high resolution is executed again at the steps 412 to 414, whereby the carrier section 23 is moved to the desired position OB.

Still further, when the steps 409 and 410 are executed, even if the operational properties of the driving motor 18, etc. are fluctuated according to the change in ambient temperature and hence the moving quantity of the carrier section 23 is fluctuated, the carrier section 23 can be moved to the desired position OB with high accuracy while compensating for the fluctuations. Especially, the in-vehicle information reproducing apparatus is characteristically used under conditions in which temperature can largely change. Therefore, execution of the steps 409 and 410 can bring about extremely large advantage.

Even further, if the carrier section 23 does not reach the allowable tolerance range ±ΔW with respect to the desired position OB even after execution of the minute adjustment, it is determined that some kind of abnormality has occurred so that the carrier section 23 cannot be moved. Therefore, the user or the like is notified of the result of determination by a warning, whereby the in-vehicle information reproducing apparatus can be prevented from undergoing crucial damage, etc., beforehand.

In the present embodiment, the description has been made of a case where the carrier section 23 is conveyed while the so-called actuator for driving the carrier section 23 being biased in the predetermined direction by the spring 19 as the biasing means, but this is not limitative. That is, the spring 19 as the biasing means may be omitted.

In a case where the carrying is performed without providing the spring 19, when the carrier means is conveyed to the desired position which is higher than the present position (as shown in FIG. 11), the carrier means is once moved to a position (H1 in FIG. 11) higher than the desired position OB, and then moved downward (in the lower direction with respect to the position H1), whereby the carrier means is moved to the desired position OB. On the other hand, when the carrier means is conveyed to the desired position which is lower than the present position (as shown in FIG. 14), the carrier means is moved in the direction of the desired position OB (in the lower direction), and further moved down to the desired position OB.

Accordingly, when the carrier section 23 is moved to the desired position OB which is higher then the present position (hereinafter referred to as "the first case"), or when it is moved to the desired position OB which is lower then the present position (hereinafter referred to as "the second case"), the carrier section 23 is always moved downward immediately before the desired position OB is reached, to thereby carry out its positioning to the desired position OB.

Therefore, in both the first and second cases, whenever the carrier section 23 finally reaches the desired position OB, the actuator such as the gear mechanism 20 which is provided for transmitting the driving force of the driving means to the carrier means to convey the same is held to a single side in a fashion being urged in the predetermined direction by receiving the driving force of the driving means.

Further, since the actuator is held to the single side, a positioning error of the carrier means with respect to the desired position OB is made smaller (e.g. reduced to about one half) than the dimensional errors present in the actuator such as the gear mechanism 20. Therefore, positioning accuracy of the carrier means to the desired position OB is improved (e.g. doubled) compared with the conventional technique. Therefore, the carrier mechanism without the spring 19 can achieve positioning of the carrier means with high accuracy, similarly to the carrier mechanism with the spring 19.

In the present embodiment, the description has been made of an in-vehicle information reproducing apparatus having a so-called auto-changer mechanism provided with a detachable accommodating rack 10, but this is not limitative. Alternatively, the accommodating rack may be fixed to the interior of the main body 9.

Further, the present embodiment is concerned with the carrier mechanism applicable to the in-vehicle information reproducing apparatus, but this is not limitative. Alternatively the carrier mechanism may be applicable to various purposes.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A carrier mechanism having accommodating means and carrier means, for carrying out positioning between said accommodating means and said carrier means, to thereby insert an object carried from said carrier means into said accommodating means or take said object accommodated in said accommodating means, out of said accommodating means to said carrier means, said carrier mechanism comprising:

driving means for moving said carrier means; and control means operable when said carrier means is moved to a desired position in one direction, for controlling said driving means so as to move said carrier means to a position in excess of said desired position and then to move said carrier means to said desired position, said control means controlling said driving means so as to move said carrier means to said desired position without exceeding said desired position when said carrier; means is moved to said desired position in a direction opposite to said one direction, wherein said control means controls said driving means such that said carrier means is driven at an accelerated rate at an initial activation, then braked after the acceleration, and finally subjected to a minute adjustment after the braking, and wherein said control means adjusts a quantity of said minute adjustment of said carrier means by said driving means, based on a remaining distance between a current position of said carrier means and said desired position.

2. The carrier mechanism according to claim 1, further comprising:

biasing means for biasing said carrier means in a predetermined direction;

wherein said control means is operable when said carrier means is moved to a desired position in a biasing direction of said biasing means, for controlling said driving means so as to move said carrier means to a position in excess of said desired position and then to move said carrier means to said desired position while opposing a biasing force of said biasing means.

3. The carrier mechanism according to claim 2, wherein said control means controls said driving means so as to move said carrier means to said desired position without exceeding said desired position while opposing said biasing force of said biasing means, when said carrier means is moved to said desired position in a direction opposite to said biasing direction of said biasing means.

4. The carrier mechanism according to claim 1, wherein said control means includes determining means for determining a direction in which said carrier means is moved, based on a present position before said carrier means is moved and said desired position.

5. The carrier mechanism according to claim 4, wherein said control means sets patterns for controlling movement of said carrier means by said driving means, based on results of determination of said determining means.

6. The carrier mechanism according to claim 1, wherein said control means adjusts a quantity of said minute adjustment of said carrier means by said driving means, based on a distance over which said carrier means has been moved after execution of said minute adjustment and a remaining distance between a position currently assumed by said carrier means and said desired position.

7. The carrier mechanism according to claim 6, wherein said control means completes said minute adjustment of said carrier means by said driving means when a distance moved by said minute adjustment is more than the remaining distance between the current position and the desired position.

8. The carrier mechanism according to claim 1, wherein said accommodating means forms an accommodating rack enabling to accommodate a recording medium in a detachable manner, said carrier means having mounted thereon a pickup for reproducing information recorded on said recording medium, and a clamping mechanism.

9. The carrier mechanism according to claim 8, wherein said accommodating rack is provided in a detachable manner for said carrier means.

10. The carrier mechanism according to claim 8, wherein said accommodating rack is always stationary for said carrier means in a reproducing apparatus.

11. The carrier mechanism according to claim 1, wherein said minute adjustment is controlled to position said carrier means within a predetermined allowable range including said desired position.

12. The carrier mechanism according to claim 11, wherein said minute adjustment is controlled to change the driving of said carrier means when a difference between the desired position and an actually reached position is not within said allowable range.

13. The carrier mechanism according to claim 12, wherein said minute adjustment is controlled to further change the driving of said carrier means when a difference between the desired position and an actually reached position does not enter within said allowable range even if predetermined times of minute adjustment are carried out under the change of the driving of the carrier means.

14. A carrier mechanism having an accommodating section and a carrier section, for carrying out positioning between said accommodating section and said carrier section, to thereby insert an object carried from said carrier section into said accommodating section or take said object accommodated in said accommodating section, out of said accommodating section to said carrier section, said carrier mechanism comprising:

a driving motor for moving said carrier section; and a control device operable when said carrier section is moved to a desired position in one direction, controlling said driving motor so as to move said carrier section to a position in excess of said desired position and then to move said carrier section to said desired position, said control device controlling said driving motor so as to move said carrier section to said desired position without exceeding said desired position when said carrier section is moved to said desired position in a direction opposite to said one direction, wherein said control device controls said driving motor such that said carrier section is driven at an accelerated rate at an initial activation, then braked after the acceleration, and finally subjected to a minute adjustment after the braking, and wherein said control device adjusts a quantity of said minute adjustment of said carrier section by said driving motor, based on a remaining distance between a current position of said carrier section and said desired position.

15. The carrier mechanism according to claim 14, wherein said control device determines a direction in which said carrier section is moved, based on a present position before said carrier section is moved and said desired position.

16. The carrier mechanism according to claim 15, wherein said control device generates patterns for controlling movement of the carrier section by said driving motor, based on the direction in which the carrier section is moved.

17. The carrier mechanism according to claim 14, wherein said control device adjusts a quantity of said minute adjustment of said carrier section by said driving motor, based on a distance over which said carrier section has been moved after execution of said minute adjustment and a remaining distance between a position currently assumed by said carrier section and said desired position.

18. The carrier mechanism according to claim 17, wherein said control device completes said minute adjustment of said carrier section by said driving motor when a distance moved by said minute adjustment is more than the remaining distance between the current position and the desired position.

19. The carrier mechanism according to claim 14, wherein said accommodating section forms an accommodating rack enabling accommodation of a recording medium in a detachable manner, said carrier section having mounted thereon a pickup for reproducing information recorded on said recording medium, and a clamping mechanism.

20. The carrier mechanism according to claim 19, wherein said accommodating rack is provided in a detachable manner for said carrier section.

21. The carrier mechanism according to claim 19, wherein said accommodating rack is always stationary for said carrier section in a reproducing apparatus.

22. The carrier mechanism according to claim 14, wherein said minute adjustment is controlled to position said carrier means within a predetermined allowable range including said desired position.

23. The carrier mechanism according to claim 22, wherein said minute adjustment is controlled to change the driving of said carrier section when a difference between the desired position and an actually reached position is not within said allowable range.

24. The carrier mechanism according to claim 23, wherein said minute adjustment is controlled to further change the driving of said carrier section when a difference between the desired position and an actually reached position does not enter within said allowable range even if predetermined times of minute adjustment are carried out under the change of the driving of the carrier section.

25. The carrier mechanism according to claim 14, further comprising:
  a biasing spring biasing said carrier section in a predetermined direction,
  wherein said control device is operable when said carrier section is moved to a desired position in a biasing direction of said biasing spring, for controlling said driving motor so as to move said carrier section to a position in excess of said desired position and then to move said carrier section to said desired position while opposing a biasing force of said biasing spring.

* * * * *